United States Patent [19]

Gutleber

[11] 3,908,088

[45] Sept. 23, 1975

[54] TIME DIVISION MULTIPLE ACCESS COMMUNICATIONS SYSTEM

[75] Inventor: Frank S. Gutleber, Little Silver, N.J.

[73] Assignee: The United States of America as represented by the Secretary of the Army, Washington, D.C.

[22] Filed: May 22, 1974

[21] Appl. No.: 472,320

[52] U.S. Cl. ..... 179/15 BC; 179/15 AP; 179/15 BS

[51] Int. Cl.² .......... H04J 3/06

[58] Field of Search ........ 179/15 BS, 15 AP, 15 BC; 340/348; 343/17.1; 325/42

[56] References Cited

UNITED STATES PATENTS

| | | | |
|---|---|---|---|
| 3,358,083 | 12/1967 | Helm | 179/15 BC |
| 3,394,224 | 7/1968 | Helm | 179/15 BC |
| 3,510,595 | 5/1970 | Gutleber | 179/15 BC |

*Primary Examiner*—Ralph D. Blakeslee
*Attorney, Agent, or Firm*—Nathan Edelberg; Robert P. Gibson; Jeremiah G. Murray

[57] ABSTRACT

A time division multiple access communications system employing perfect noise codes to enable utilization of the system. The noise codes employed are of the type termed code mates having correlation functions which upon detection provide an impulse autocorrelation function. Improvements in signal-to-noise power ratio and in signal-to-jamming power ratio will be seen to result, as contrasted with similar communications systems operating with comparable peak powers but without coding.

5 Claims, 32 Drawing Figures

| TIME SLOT | 1 | 2 | 3 | 4 | 5 | 6 | 7 |
|---|---|---|---|---|---|---|---|
| PULSE 0 | 1 | 0 | 0 | 0 | | | |
| COMP. 0 | | 1 | 0 | 0 | 0 | | |
| FILTER 0 | | | 1 | 0 | 0 | 0 | |
| 1 | | | | 0 | 1 | 1 | 1 |
| FILTER OUT Ɛ | 1 | • | 0 | $0^4$ | 0 | • | 1 |

Fig. 6A.

| TIME SLOT | 1 | 2 | 3 | 4 | 5 | 6 | 7 |
|---|---|---|---|---|---|---|---|
| PULSE 0 | 0 | 0 | 1 | 0 | | | |
| COMP. 1 | | 1 | 1 | 0 | 1 | | |
| FILTER 0 | | | 0 | 0 | 1 | 0 | |
| 0 | | | | 0 | 0 | 1 | 0 |
| FILTER OUT Ɛ | 0 | • | 1 | $0^4$ | 1 | • | 0 |

Fig. 6B

| TIME SLOT | 1 | 2 | 3 | 4 | 5 | 6 | 7 |
|---|---|---|---|---|---|---|---|
| | 1 | • | 0 | $0^4$ | 0 | • | 1 |
| | 0 | • | 1 | $0^4$ | 1 | • | 0 |
| Ɛ | • | • | • | $0^8$ | • | • | • |

Fig. 6C.

| TIME SLOT | 1 | 2 | 3 | 4 |
|---|---|---|---|---|
| USER #1 | 0 | | | |
| USER #2 | | $0^2$ | | |
| USER #3 | | | 1 | |
| USER #4 | | | | $1^3$ |
| Ɛ | 0 | $0^2$ | 1 | $1^3$ |

Fig. 6D.

| TIME SLOT | -3 | -2 | -1 | +1 | +2 | +3 | +4 |
|---|---|---|---|---|---|---|---|
| USER #1 | 1 | 0 | 0 | 0 | | | |
| USER #2 | | $1^2$ | $0^2$ | $0^2$ | $0^2$ | | |
| USER #3 | | | 0 | 1 | 1 | 1 | |
| USER #4 | | | | $0^3$ | $1^3$ | $1^3$ | $1^3$ |
| Ɛ | 1 | 1 | $0^4$ | $0^5$ | $1^2$ | $1^4$ | $1^3$ |

Fig. 6E.

| TIME SLOT | -3 | -2 | -1 | +1 | +2 | +3 | +4 |
|---|---|---|---|---|---|---|---|
| USER #1 | 0 | 0 | 1 | 0 | | | |
| USER #2 | | $0^2$ | $0^2$ | $1^2$ | $0^2$ | | |
| USER #3 | | | 1 | 1 | 0 | 1 | |
| USER #4 | | | | $1^3$ | $1^3$ | $0^3$ | $1^3$ |
| Ɛ | 0 | $0^3$ | • | $1^5$ | • | $0^2$ | $1^3$ |

Fig. 6F.

| TIME SLOT | -3 | -2 | -1 | +1 | +2 | +3 | +4 | +5 | +6 | +7 |
|---|---|---|---|---|---|---|---|---|---|---|
| PULSE 0 | 1 | 1 | $0^4$ | $0^5$ | $1^2$ | $1^4$ | $1^3$ | | | |
| COMP. 0 | | 1 | 1 | $0^4$ | $0^5$ | $1^2$ | $1^4$ | $1^3$ | | |
| FILTER 0 | | | 1 | 1 | $0^4$ | $0^5$ | $1^2$ | $1^4$ | $1^3$ | |
| 1 | | | | 0 | 0 | $1^4$ | $1^5$ | $0^2$ | $0^4$ | $0^3$ |
| FILTER OUT Ɛ | 1 | $1^2$ | $0^2$ | $0^9$ | $0^8$ | $1^5$ | $1^{14}$ | $1^5$ | 0 | $0^3$ |

Fig. 6G.

| TIME SLOT | -3 | -2 | -1 | +1 | +2 | +3 | +4 | +5 | +6 | +7 |
|---|---|---|---|---|---|---|---|---|---|---|
| PULSE 0 | 0 | $0^3$ | • | $1^5$ | • | $0^2$ | $1^3$ | | | |
| COMP. 1 | | 1 | $1^3$ | 0 | $0^5$ | • | $1^2$ | $0^3$ | | |
| FILTER 0 | | | 0 | $0^3$ | • | $1^5$ | • | $0^2$ | $1^3$ | |
| 0 | | | | 0 | $0^3$ | • | $1^5$ | • | $0^2$ | $1^3$ |
| FILTER OUT Ɛ | 0 | $0^2$ | $1^2$ | 1 | $0^8$ | $1^3$ | $1^{10}$ | $0^5$ | 1 | $1^3$ |

Fig. 6H.

| TIME SLOT | -3 | -2 | -1 | +1 | +2 | +3 | +4 | +5 | +6 | +7 |
|---|---|---|---|---|---|---|---|---|---|---|
| Ɛ1 | 1 | $1^2$ | $0^2$ | $0^9$ | $0^8$ | $1^5$ | $1^{14}$ | $1^5$ | 0 | $0^3$ |
| Ɛ2 | 0 | $0^2$ | $1^2$ | 1 | $0^8$ | $1^3$ | $1^{10}$ | $0^5$ | 1 | $1^3$ |
| ƐT | • | • | • | $0^8$ | $0^{16}$ | $1^8$ | $1^{24}$ | • | • | • |

Fig. 6i

Fig. 7A.

| TIME SLOT | 1 | 2 | 3 | 4 | 5 | 6 | 7 |
|---|---|---|---|---|---|---|---|
| PULSE 0 | 1 | 0 | 0 | 0 | | | |
| COMP. 0 | | 1 | 0 | 0 | 0 | | |
| FILTER 0 | | | 1 | 0 | 0 | 0 | |
| 1 | | | | 0 | 1 | 1 | 1 |
| FILTER OUT ε | 1 | • | 0 | $0^4$ | 0 | • | 1 |

Fig. 7B.

| TIME SLOT | 1 | 2 | 3 | 4 | 5 | 6 | 7 |
|---|---|---|---|---|---|---|---|
| PULSE 0 | 0 | 1 | 0 | 0 | | | |
| COMP. 0 | | 0 | 1 | 0 | 0 | | |
| FILTER 1 | | | 1 | 0 | 1 | 1 | |
| 0 | | | | 0 | 1 | 0 | 0 |
| FILTER OUT ε | 0 | • | 1 | $0^4$ | 1 | • | 0 |

| TIME SLOT | 1 | 2 | 3 | 4 | 5 | 6 | 7 |
|---|---|---|---|---|---|---|---|
| | 1 | • | 0 | $0^4$ | 0 | • | 1 |
| | 0 | • | 1 | $0^4$ | 1 | • | 0 |
| ε | • | • | • | $0^8$ | • | • | • |

Fig. 7C.

| TIME SLOT | 1 | 2 | 3 | 4 |
|---|---|---|---|---|
| USER #1 | 0 | | | |
| USER #2 | | 0 | | |
| USER #3 | | | | 0 |
| ε | 0 | 0 | • | 0 |

Fig. 7D.

| TIME SLOT | -3 | -2 | -1 | +1 | +2 | +3 | +4 |
|---|---|---|---|---|---|---|---|
| USER #1 | 1 | 0 | 0 | 0 | | | |
| USER #2 | | 1 | 0 | 0 | 0 | | |
| USER #3 | | | | 1 | 0 | 0 | 0 |
| ε | 1 | • | $0^2$ | 0 | $0^2$ | 0 | 0 |

Fig. 7E.

| TIME SLOT | -3 | -2 | -1 | +1 | +2 | +3 | +4 |
|---|---|---|---|---|---|---|---|
| USER #1 | 0 | 1 | 0 | 0 | | | |
| USER #2 | | 0 | 1 | 0 | 0 | | |
| USER #3 | | | | 0 | 1 | 0 | 0 |
| ε | 0 | • | • | $0^3$ | • | 0 | 0 |

Fig. 7F.

| TIME SLOT | -3 | -2 | -1 | +1 | +2 | +3 | +4 | +5 | +6 | +7 |
|---|---|---|---|---|---|---|---|---|---|---|
| PULSE 0 | 1 | • | $0^2$ | 0 | $0^2$ | 0 | 0 | | | |
| COMP. 0 | | 1 | • | $0^2$ | 0 | $0^2$ | 0 | 0 | | |
| FILTER 0 | | | 1 | • | $0^2$ | 0 | $0^2$ | 0 | 0 | |
| 1 | | | | 0 | • | $1^2$ | 1 | $1^2$ | 1 | 1 |
| FILTER OUT ε | 1 | 1 | 0 | $0^4$ | $0^5$ | $0^2$ | $0^3$ | • | • | 1 |

Fig. 7G.

| TIME SLOT | -3 | -2 | -1 | +1 | +2 | +3 | +4 | +5 | +6 | +7 |
|---|---|---|---|---|---|---|---|---|---|---|
| PULSE 0 | 0 | • | • | $0^3$ | • | 0 | 0 | | | |
| COMP. 0 | | 0 | • | • | $0^3$ | • | 0 | 0 | | |
| FILTER 1 | | | 1 | • | • | $1^3$ | • | 1 | 1 | |
| 0 | | | | 0 | • | • | $0^3$ | • | 0 | 0 |
| FILTER OUT ε | 0 | 0 | 1 | $0^4$ | $0^3$ | $1^2$ | $0^5$ | • | • | 0 |

Fig. 7H.

| TIME SLOT | -3 | -2 | -1 | +1 | +2 | +3 | +4 | +5 | +6 | +7 |
|---|---|---|---|---|---|---|---|---|---|---|
| ε1 | 1 | 1 | 0 | $0^4$ | $0^5$ | $0^2$ | $0^3$ | • | • | 1 |
| ε2 | 0 | 0 | 1 | $0^4$ | $0^3$ | $1^2$ | $0^5$ | • | • | 0 |
| εT | • | • | • | $0^8$ | $0^8$ | • | $0^8$ | • | • | • |

Fig. 7i

Fig. 8A.

| TIME SLOT | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PULSE 0 | 1 | 0 | 0 | 0 | 0 | 1 | 0 | 0 | | | | | | | |
| COMP. 0 | | 1 | 0 | 0 | 0 | 0 | 1 | 0 | 0 | | | | | | |
| FILTER 1 | | | 0 | 1 | 1 | 1 | 1 | 0 | 1 | 1 | | | | | |
| 0 | | | | 1 | 0 | 0 | 0 | 0 | 1 | 0 | 0 | | | | |
| 0 | | | | | 1 | 0 | 0 | 0 | 0 | 1 | 0 | 0 | | | |
| 0 | | | | | | 1 | 0 | 0 | 0 | 0 | 1 | 0 | 0 | | |
| 0 | | | | | | | 1 | 0 | 0 | 0 | 0 | 1 | 0 | 0 | |
| 1 | | | | | | | | 0 | 1 | 1 | 1 | 1 | 0 | 1 | 1 |
| FILTER OUT ε | 1 | • | $0^3$ | • | 0 | • | 0 | $0^8$ | 0 | • | 0 | • | $0^3$ | • | 1 |

Fig. 8B.

| TIME SLOT | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PULSE 1 | 0 | 1 | 1 | 1 | 0 | 1 | 0 | 0 | | | | | | | |
| COMP. 1 | | 0 | 1 | 1 | 1 | 0 | 1 | 0 | 0 | | | | | | |
| FILTER 0 | | | 1 | 0 | 0 | 0 | 1 | 0 | 1 | 1 | | | | | |
| 1 | | | | 0 | 1 | 1 | 1 | 0 | 1 | 0 | 0 | | | | |
| 0 | | | | | 1 | 0 | 0 | 0 | 1 | 0 | 1 | 1 | | | |
| 0 | | | | | | 1 | 0 | 0 | 0 | 1 | 0 | 1 | 1 | | |
| 0 | | | | | | | 1 | 0 | 0 | 0 | 1 | 0 | 1 | 1 | |
| 1 | | | | | | | | 0 | 1 | 1 | 1 | 0 | 1 | 0 | 0 |
| FILTER OUT ε | 0 | • | $1^3$ | • | 1 | • | 1 | $0^8$ | 1 | • | 1 | • | $1^3$ | • | 0 |

Fig. 8C.

| TIME SLOT | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | 1 | • | $0^3$ | • | 0 | • | 0 | $0^8$ | 0 | • | 0 | • | $0^3$ | • | 1 |
| | 0 | • | $1^3$ | • | 1 | • | 1 | $0^8$ | 1 | • | 1 | • | $1^3$ | • | 0 |
| ε | • | • | • | • | • | • | • | $0^{16}$ | • | • | • | • | • | • | • |

Fig. 8D.

| TIME SLOT | 1 | 2 | 3 | 4 | 5 | 6 | 7 | 8 |
|---|---|---|---|---|---|---|---|---|
| USER #1 | 0 | | | | | | | |
| USER #2 | | $0^2$ | | | | | | |
| USER #3 | | | 1 | | | | | |
| USER #4 | | | | $1^3$ | | | | |
| USER #5 | | | | | 0 | | | |
| USER #6 | | | | | | $0^2$ | | |
| USER #7 | | | | | | | 1 | |
| USER #8 | | | | | | | | $1^3$ |
| Σ | 0 | $0^2$ | 1 | $1^3$ | 0 | $0^2$ | 1 | $1^3$ |

Fig. 8E.

| TIME SLOT | -7 | -6 | -5 | -4 | -3 | -2 | -1 | +1 | +2 | +3 | +4 | +5 | +6 | +7 | +8 |
|---|---|---|---|---|---|---|---|---|---|---|---|---|---|---|---|
| USER #1 | 1 | 0 | 0 | 0 | 0 | 1 | 0 | 0 | | | | | | | |
| USER #2 | | $1^2$ | $0^2$ | $0^2$ | $0^2$ | $0^2$ | $1^2$ | $0^2$ | $0^2$ | | | | | | |
| USER #3 | | | 0 | 1 | 1 | 1 | 1 | 0 | 1 | 1 | | | | | |
| USER #4 | | | | $0^3$ | $1^3$ | $1^3$ | $1^3$ | $1^3$ | $0^3$ | $1^3$ | $1^3$ | | | | |
| USER #5 | | | | | 1 | 0 | 0 | 0 | 0 | 1 | 0 | 0 | | | |
| USER #6 | | | | | | $1^2$ | $0^2$ | $0^2$ | $0^2$ | $0^2$ | $1^2$ | $0^2$ | $0^2$ | | |
| USER #7 | | | | | | | 0 | 0 | 1 | 1 | 1 | 0 | 1 | 1 | |
| USER #8 | | | | | | | | $0^3$ | $1^3$ | $1^3$ | $1^3$ | $1^3$ | $0^3$ | $1^3$ | $1^3$ |
| Σ | 1 | 1 | $0^4$ | $0^5$ | $1^2$ | $1^4$ | 1 | $0^6$ | $0^3$ | $1^7$ | $1^8$ | 0 | $0^4$ | $1^4$ | $1^3$ |

Fig. 8F.

| TIME SLOT | -7 | -6 | -5 | -4 | -3 | -2 | -1 | +1 | +2 | +3 | +4 | +5 | +6 | +7 | +8 |
|---|---|---|---|---|---|---|---|---|---|---|---|---|---|---|---|
| USER #1 | 1 | 0 | 0 | 0 | 1 | 0 | 1 | 1 | | | | | | | |
| USER #2 | | $1^2$ | $0^2$ | $0^2$ | $0^2$ | $1^2$ | $0^2$ | $1^2$ | $1^2$ | | | | | | |
| USER #3 | | | 0 | 1 | 1 | 1 | 0 | 1 | 0 | 0 | | | | | |
| USER #4 | | | | $0^3$ | $1^3$ | $1^3$ | $1^3$ | $0^3$ | $1^3$ | $0^3$ | $0^3$ | | | | |
| USER #5 | | | | | 1 | 0 | 0 | 0 | 1 | 0 | 1 | 1 | | | |
| USER #6 | | | | | | $1^2$ | $0^2$ | $0^2$ | $0^2$ | $1^2$ | $0^2$ | $1^2$ | $1^2$ | | |
| USER #7 | | | | | | | 0 | 1 | 1 | 1 | 0 | 1 | 0 | 0 | |
| USER #8 | | | | | | | | $0^3$ | $1^3$ | $1^3$ | $1^3$ | $0^3$ | $1^3$ | $0^3$ | $0^3$ |
| Σ | 1 | 1 | $0^4$ | $0^5$ | $1^4$ | $1^6$ | $0^3$ | $0^4$ | $1^7$ | 1 | $0^2$ | 1 | $1^4$ | $0^4$ | $0^3$ |

| TIME SLOT | | -7 | -6 | -5 | -4 | -3 | -2 | -1 | +1 | +2 | +3 | +4 | +5 | +6 | +7 | +8 | +9 | +10 | +11 | +12 | +13 | +14 | +15 |
|---|---|---|---|---|---|---|---|---|---|---|---|---|---|---|---|---|---|---|---|---|---|---|---|
| PULSE | 0 | 1 | 1 | $0^{4}$ | $0^{5}$ | $1^{2}$ | $1^{4}$ | 1 | $0^{6}$ | $0^{3}$ | $1^{7}$ | $1^{8}$ | 0 | $0^{4}$ | $1^{4}$ | $1^{3}$ | | | | | | | |
| COMP. | 0 | | 1 | 1 | $0^{4}$ | $0^{5}$ | $1^{2}$ | $1^{4}$ | 1 | $0^{6}$ | $0^{3}$ | $1^{7}$ | $1^{8}$ | 0 | $0^{4}$ | $1^{4}$ | $1^{3}$ | | | | | | |
| FILTER | 1 | | | 0 | 0 | $1^{4}$ | $1^{5}$ | $0^{2}$ | $0^{4}$ | 0 | $1^{6}$ | $1^{3}$ | $0^{7}$ | $0^{8}$ | 1 | $1^{4}$ | $0^{4}$ | $0^{3}$ | | | | | |
| | 0 | | | | 1 | 1 | $0^{4}$ | $0^{5}$ | $1^{2}$ | $1^{4}$ | 1 | $0^{6}$ | $0^{3}$ | $1^{7}$ | $1^{8}$ | 0 | $0^{4}$ | $1^{4}$ | $1^{3}$ | | | | |
| | 0 | | | | | 1 | 1 | $0^{4}$ | $0^{5}$ | $1^{2}$ | $1^{4}$ | 1 | $0^{6}$ | $0^{3}$ | $1^{7}$ | $1^{8}$ | 0 | $0^{4}$ | $1^{4}$ | $1^{3}$ | | | |
| | 0 | | | | | | 1 | 1 | $0^{4}$ | $0^{5}$ | $1^{2}$ | $1^{4}$ | 1 | $0^{6}$ | $0^{3}$ | $1^{7}$ | $1^{8}$ | 0 | $0^{4}$ | $1^{4}$ | $1^{3}$ | | |
| | 0 | | | | | | | 1 | 1 | $0^{4}$ | $0^{5}$ | $1^{2}$ | $1^{4}$ | 1 | $0^{6}$ | $0^{3}$ | $1^{7}$ | $1^{8}$ | 0 | $0^{4}$ | $1^{4}$ | $1^{3}$ | |
| | 1 | | | | | | | | 0 | 0 | $1^{4}$ | $1^{5}$ | $0^{2}$ | $0^{4}$ | 0 | $1^{6}$ | $1^{3}$ | $0^{7}$ | $0^{8}$ | 1 | $1^{4}$ | $0^{4}$ | $0^{3}$ |
| FILTER OUT | ε | 1 | $1^{2}$ | $0^{4}$ | $0^{9}$ | $1^{3}$ | $1^{9}$ | $0^{4}$ | $0^{16}$ | $0^{14}$ | $1^{16}$ | $1^{24}$ | $0^{6}$ | $0^{18}$ | $1^{6}$ | $1^{28}$ | $1^{12}$ | $0^{3}$ | $0^{6}$ | $1^{4}$ | $1^{11}$ | 0 | $0^{3}$ |

Fig. 8G.

| TIME SLOT | | -7 | -6 | -5 | -4 | -3 | -2 | -1 | +1 | +2 | +3 | -4 | +5 | +6 | +7 | +8 | +9 | +10 | +11 | +12 | +13 | +14 | +15 |
|---|---|---|---|---|---|---|---|---|---|---|---|---|---|---|---|---|---|---|---|---|---|---|---|
| PULSE | 1 | 0 | 0 | $1^{4}$ | $1^{5}$ | $0^{4}$ | $0^{6}$ | $1^{3}$ | $1^{4}$ | $0^{7}$ | 0 | $1^{2}$ | 0 | $0^{4}$ | $1^{4}$ | $1^{3}$ | | | | | | | |
| COMP. | 1 | | 0 | 0 | $1^{4}$ | $1^{5}$ | $0^{4}$ | $0^{6}$ | $1^{3}$ | $1^{4}$ | $0^{7}$ | 0 | $1^{2}$ | 0 | $0^{4}$ | $1^{4}$ | $1^{3}$ | | | | | | |
| FILTER | 0 | | | 1 | 1 | $0^{4}$ | $0^{5}$ | $1^{4}$ | $1^{6}$ | $0^{3}$ | $0^{4}$ | $1^{7}$ | 1 | $0^{2}$ | 1 | $1^{4}$ | $0^{4}$ | $0^{3}$ | | | | | |
| | 1 | | | | 0 | 0 | $1^{4}$ | $1^{5}$ | $0^{4}$ | $0^{6}$ | $1^{3}$ | $1^{4}$ | $0^{7}$ | 0 | $1^{2}$ | 0 | $0^{4}$ | $1^{4}$ | $1^{3}$ | | | | |
| | 0 | | | | | 1 | 1 | $0^{4}$ | $0^{5}$ | $1^{4}$ | $1^{6}$ | $0^{3}$ | $0^{4}$ | $1^{7}$ | 1 | $0^{2}$ | 1 | $1^{4}$ | $0^{4}$ | $0^{3}$ | | | |
| | 0 | | | | | | 1 | 1 | $0^{4}$ | $0^{5}$ | $1^{4}$ | $1^{6}$ | $0^{3}$ | $0^{4}$ | $1^{7}$ | 1 | $0^{2}$ | 1 | $1^{4}$ | $0^{4}$ | $0^{3}$ | | |
| | 0 | | | | | | | 1 | 1 | $0^{4}$ | $0^{5}$ | $1^{4}$ | $1^{6}$ | $0^{3}$ | $0^{4}$ | $1^{7}$ | 1 | $0^{2}$ | 1 | $1^{4}$ | $0^{4}$ | $0^{3}$ | |
| | 1 | | | | | | | | 0 | 0 | $1^{4}$ | $1^{5}$ | $0^{4}$ | $0^{6}$ | $1^{3}$ | $1^{4}$ | $0^{7}$ | 0 | $1^{2}$ | 0 | $0^{4}$ | $1^{4}$ | $1^{3}$ |
| FILTER OUT | ε | 0 | $0^{2}$ | $1^{4}$ | $1^{9}$ | $0^{3}$ | $0^{4}$ | $1^{4}$ | • | $0^{18}$ | • | $1^{24}$ | $0^{10}$ | $0^{14}$ | $1^{10}$ | $1^{20}$ | $0^{12}$ | $1^{3}$ | $1^{6}$ | $0^{4}$ | $0^{11}$ | 1 | $1^{3}$ |

FiG. 8H.

| TIME SLOT | -7 | -6 | -5 | -4 | -3 | -2 | -1 | +1 | +2 | +3 | +4 | +5 | +6 | +7 | +8 | +9 | +10 | +11 | +12 | +13 | +14 | +15 |
|---|---|---|---|---|---|---|---|---|---|---|---|---|---|---|---|---|---|---|---|---|---|---|
| ε 1 | 1 | $1^{2}$ | $0^{4}$ | $0^{9}$ | $1^{3}$ | $1^{9}$ | $0^{4}$ | $0^{16}$ | $0^{14}$ | $1^{16}$ | $1^{24}$ | $0^{6}$ | $0^{18}$ | $1^{6}$ | $1^{28}$ | $1^{12}$ | $0^{3}$ | $0^{6}$ | $1^{4}$ | $1^{11}$ | 0 | $0^{3}$ |
| ε 2 | 0 | $0^{2}$ | $1^{4}$ | $1^{9}$ | $0^{3}$ | $0^{9}$ | $1^{4}$ | • | $0^{18}$ | • | $1^{24}$ | $0^{10}$ | $0^{14}$ | $1^{10}$ | $1^{20}$ | $0^{12}$ | $1^{3}$ | $1^{6}$ | $0^{4}$ | $0^{11}$ | 1 | $1^{3}$ |
| εT | • | • | • | • | • | • | • | $0^{16}$ | $0^{32}$ | $1^{16}$ | $1^{48}$ | $0^{16}$ | $0^{32}$ | $1^{16}$ | $1^{48}$ | • | • | • | • | • | • | • |

Fig. 8i

TIME DIVISION MULTIPLE ACCESS COMMUNICATIONS SYSTEM

The invention described herein may be manufactured and used by or for the Government for governmental purposes without the payment of any royalties thereon or therefor.

BACKGROUND OF THE INVENTION

This invention relates to pulse signalling systems of the code type and, more particularly, to the use of autocorrelation techniques in time division multiple access communications systems.

Correlation techniques have been utilized in the past in signal processing systems employing signals in the form of a pulse or sequence of pulses. These pulse signalling systems include, for example, pulse communication systems, such as over-the-horizon systems employing various types of scatter techniques, satellite communication systems and the like; and multiple access systems employing address codes to enable utilization of the system. Correlation techniques employed in pulse communication systems result in increased signal-to-noise ratios without increase of transmittor power and minimize multiple path effects. Correlation techniques employed in a multiple access environment also result in increased signal-to-noise ratio without increase of transmittor power and, if properly coded, prevent or at least minimize interference or crosstalk between one or more address codes.

According to some prior art active correlation techniques, the received signal is processed by obtaining the product of code elements of the received signal and code elements of a locally generated signal of the same waveform and period as the received signal, and integrating the resultant product. Other correlation techniques employ a passive matched filter which pulse compresses a wide pulse to a narrow pulse whose peak amplitude is increased by the number of code bits present in the processed code. The optimum output for such a correlation would be a single peak of high amplitude which has a width substantially narrower than the pulse width of the received signal. However, many of these correlation systems did not produce the desired optimum waveform but, rather, provided an output whose waveform had spurious peaks in addition to the desired high amplitude peak. As was readily apparent to those skilled in the art, the presence of such spurious peaks was undesirable and would prevent implementing the system described in this invention.

My issued U.S. Pat. Nos. 3,461,451, 3,519,746 and 3,634,765, on the other hand, describe a number of improved correlation techniques which result in the development of an impulse autocorrelation function for such systems, providing a waveform having a single, high amplitude peak completely free from spurious peaks of lower amplitude elsewhere in the waveform. These patents disclose a number of classes of codes, pairs of code signals termed code mates, having amplitudes and autocorrelation functions which provide a peak output at a given time and a zero output (or outputs having the same magnitude but opposite polarity) at all other times. When the code mates are detected and the resultant detected outputs are linearly added, there is provided the impulse output of high amplitude at the given time and a zero output at all other times.

SUMMARY OF THE INVENTION

As will become clear hereinafter, the present invention employs these code mate, code signal pairs for a time division multiple access communications system. One advantage which follows such utilization is to increase detection efficiency over other time division multiple access systems where detection efficiency suffered as the number of users accessing the system increased. One proposed solution for increasing the efficiency in these other systems — namely, increasing the peak power radiated as the number of users increase — is not generally acceptable as the peak radiation from power output devices is, first of all, limited and, secondly, size and weight physically restrict the power antennas usable in many applications, such as in mobile communications. By utilizing a multiplexed coding technique in conjunction with providing a synchronous time reference for all users accesssing the system — and, further, by utilizing multiplexed codes whose autocorrelation function compresses to a single impulse, according to the invention —, the detection efficiency exhibited becomes comparable to that of frequency division multiple access communications systems. Improvements in signal-to-noise power ratio and in signal-to-jamming power ratio also follow the use of these multiplexed code mate pairs in this multiple access communications environment.

As will become apparent to those skilled in the art, the techniques described below may be applied in satellite communications systems, to the signalling and control traffic, to the message traffic, or to both. In order to facilitate an understanding of these techniques for general application in any time division multiple access communication system, reference will be had to three code signal pairs to illustrate the advantages which result from using perfect noise code mates which compress to a single impulse, lobelessly.

It will thus be seen that an object of the present invention is to provide a time division multiple access communications system of increased detection efficiency, yet without being hampered by peak power limitations of available power output devices or by size and weight restrictions.

Another object of the invention will be seen to provide such a system with increased signal-to-noise and signal-to-jamming power ratio, even though the number of users accessing the system is large.

BRIEF DESCRIPTION OF THE DRAWINGS

These and other features of the present invention will be more readily understood from a consideration of the following description taken in connection with the accompanying drawings in which:

FIGS. 6*a*–6*i* are tables helpful in an understanding of the present invention for a first code mate pair;

FIGS. 7*a*–7*i* are tables helpful in an understanding of the present invention for a second code mate pair; and FIGS. 8a–8i are tables helpful in an understanding of the invention for a third code mate pair.

DETAILED DESCRIPTION OF THE DRAWINGS

Figures 1, 2, 3, 4, 5:
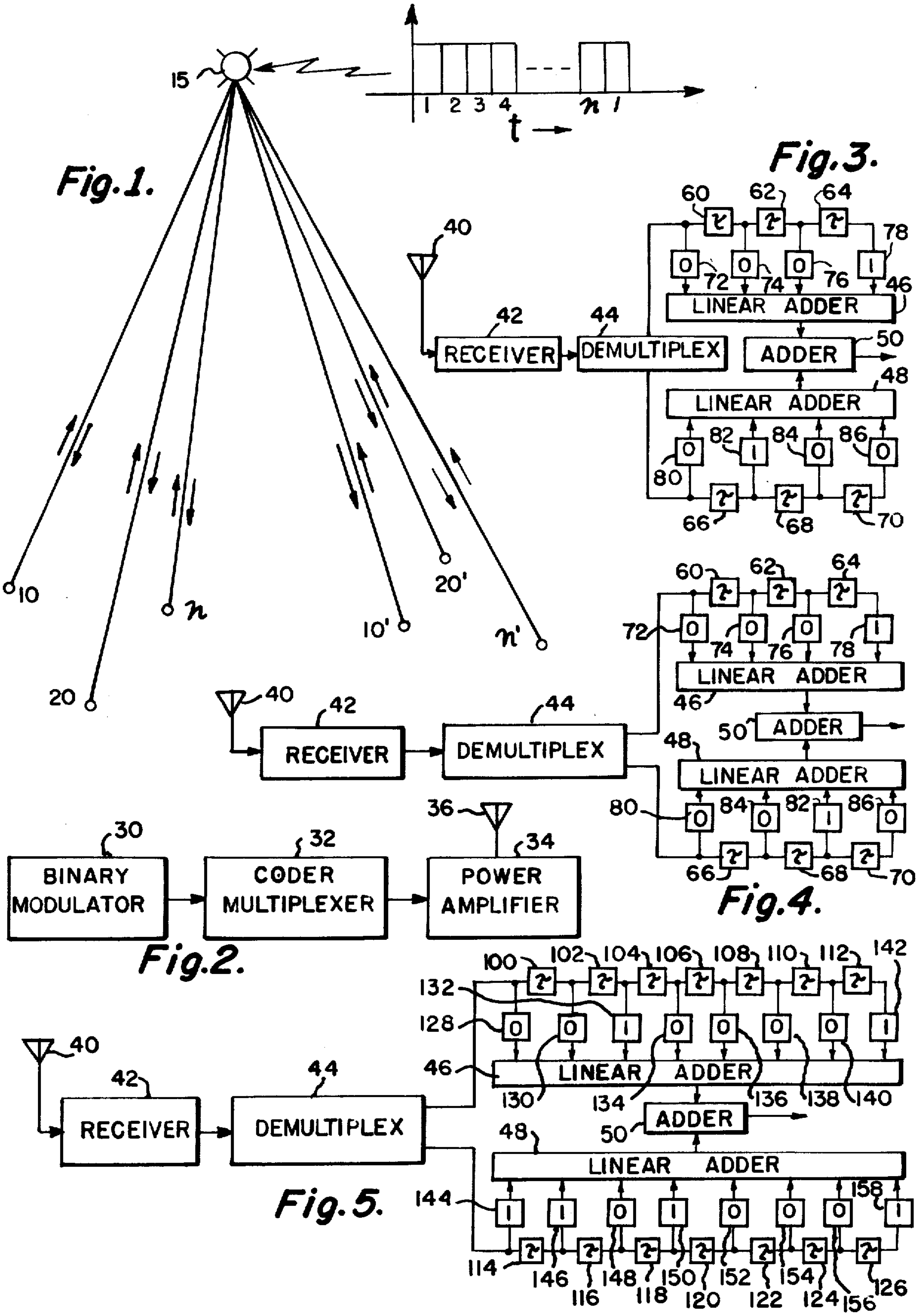
FIG. 1 is a simplified illustration of a multiple access communications system employing time division multiple accessing.
FIG. 2 is a functional block diagram of the transmitting portion of such a communications system employing multiplexed coding.
FIGS. 3–5 are functional block diagrams of the receiving portions of such a communications system for use with different multiplexed codings according to the invention.

The arrangement of FIG. 1 pictorially illustrates a time division multiple access communications system in which all users accessing the system are provided with a synchronous time reference. Such referencing may be accomplished in any appropriate manner, so as to link one user at terminal 10 with another at terminal 10' during the time slot No. 1, a second user at terminal 20 with one at terminal 20' during the time slot No. 2, etc., through a user at terminal *n* linked during time slot No. *n* with another user at terminal *n'*. Each pair of users will be understood as having their associated time slot (or pair of time slots if duplex, rather than simplex, operation is employed) established and maintained synchronous using controlled timing techniques. The communications system is illustratively shown as utilizing a satellite 15 for the transmission, designed of a nature to communicate signalling and control traffic, message traffic, or both.

To utilize multiplexed coding in the time division multiple access communications system of FIG. 1, a transmitting arrangement such as is symbolically illustrated in FIG. 2 may be employed. As shown, a binary modulator 30, a coder-multiplexer 32, a power amplifier 34 and an antenna 36 are included, with the antenna 36 being directed at the satellite 15 of FIG. 1. These units may be located at the ground installation, for example at terminal 10 of FIG. 1, with the modulator 30 and coder-multiplexer 32 comprising clock, synchronizing generator, code generator and mixing apparatus to provide output code signals, multiplexed in time, for amplification and subsequent propagation by the antenna 36 to the satellite 15. As will become clear from the discussion that follows, the coder-multiplexer 32 is designed such that code mate pairs are transmitted which compress to a single impulse, lobelessly.

FIGS. 3, 4 and 5 symbolically illustrate three receiver arrangements for the multiplexed coding system, for use, individually, with the respective code mate pairs of the tables of FIGS. 6, 7 and 8. The three arrangements will be seen common in their incorporation of an antenna 40, coupled to a receiver 42, the output of which is applied to a demultiplexer 44. The specific type of multiplexing employed in the communications system may be of any type by which the code signals may later be separated and made orthogonal to each other so as to be non-interfering. Thus, the demultiplexer 44 will be consistent with the type of multiplexing employed at the transmitter — which may include time division multiplexing, frequency division multiplexing, quadrature phase modulation, horizontal and vertical antenna polarization, and the like. The remaining elements of FIGS. 3, 4 and 5 essentially comprise match filter configurations, with the constructions of these three drawings being physically located either at the satellite of FIG. 1 or at any receiving location. If aboard the satellite, the output signal developed is radiated to the user accessing the system, while if at the receiving location, the output signal is applied to appropriate signal utilization apparatus there provided.

Referring, more particularly, to the construction of FIGS. 3–5, it will be seen that a pair of linear adders 46, 48 are included, with the outputs of each being applied to a further adder 50, which provides the output signal. The input signals to the adders 46, 48, on the other hand, are provided, after demultiplexing, by means of a plurality of time delay circuits and by means of a plurality of phase control circuits. Specifically, with respect to FIGS. 3 and 4, the circuits 60, 62, 64, 66, 68 and 70 each delay the detected code signal by one time slot of the synchronous timing cycle. The phase control circuits 72, 74, 76, 78, 80, 82, 84 and 86 are of construction to provide a signal feedthrough either with 0° or 180° phase shift, depending upon the specific code mate operated upon. In FIGS. 3 and 4, the circuits identified by the reference numerals 72, 74, 76, 80, 84 and 86 provide zero phase reversal for the code signal, whereas the circuits 78 and 82 provide the 180° phase reversal required. In the description that follows, it will be understood that the inclusion of a "0" within these phase control circuits represents a signal feedthrough with zero phase alteration while the inclusion of a "1" indicates a phase reversal of 180°. A comparison of the receiver arrangements of FIGS. 3 and 4 will show that the only difference resides in the positioning of the phase control circuits 82 and 84 — the phase control 82 being inserted at a point between the delay circuits 66 and 68 in FIG. 3 and between the delay circuits 68 and 70 in FIG. 4. Correspondingly, the phase control circuit 84 is connected at a point between the delay circuits 68 and 70 in FIG. 3, and between the delay circuits 66 and 68 in FIG. 4.

As will readily be apparent, the receiver configuration of FIG. 5 is more complex then either those of FIG. 3 or FIG. 4. The reason for this follows from the use, in FIG. 5, of an 8-bit code for the communications system, as contrasted with the use of a 4-bit code in the systems using the receiver arrangements of FIGS. 3 and 4. However, as with FIGS. 3 and 4, the FIG. 5 construction incorporates a plurality of time delay circuits and phase control circuits for both linear adders 46 and 48.

As illustrated, the arrangements of FIGS. 3–5 are designed for use with specific mate codes listed in my above-mentioned patents. It should be clear from the following description, however, that other, similar receiver configurations — and specifically, match filter arrangements — can be selected in accordance with the particular code format being employed.

The tables of FIG. 6 illustrate the invention for code mate pairs of the following type:

Code (a) = 1000
Code (b) =0010
Where:
0 indicates a plus (+); and
1 indicates a minus (−), for four users accessing the system in four available time slots. To generalize, so as to illustrate the concept, different amplitudes and phases are assumed for the separate users to demonstrate that operation with noise codes of this type is independent of the accessing terminal size and of the bit information. To this end, the amplitudes and the phases of the four users are assumed to be +1, +2, −1, and −3.

The compression of the code 1000 in the top portion of the match filter of FIG. 3 is illustrated by the table in FIG. 6a, with the last line indicating the autocorrelation function from the adder 46. The compression of the code 0010 in the bottom portion of the match filter of FIG. 3 is illustrated by the table in FIG. 6b, where the last line indicates the autocorrelation function from the adder 48. The table in FIG. 6*c* — and, specifically, the last line therein — illustrates the output signal of the adder 50, showing that the linear sum of the orthogonally multiplexed filter outputs results in a compression of the composite code to a single impulse.

In applying the example code pairs to a time division multiple access system according to the invention, it will first be understood that the table in FIG. 6*d* represents the output of an uncoded system with the four users whose amplitudes and phases are +1, +2, −1 and −3, and with the accessing of the system being in four individual time slots. The summed output with this arrangement is set forth in the last line of this table.

The table in FIG. 6*e*, on the other hand, illustrates both the multiplex code signals that would be received by these four accessing users, as well as the linear sum of the coded signals as would appear at the multiple access inputs of the receiving units — for example, aboard the satellite. The code signal received by user No. 3 will be seen to be of the same amplitude but of opposite polarity to the code signal received by user No. 1, while the code signal received by user No. 2 will be seen to be of twice the amplitude and of the same phase as the signal received by user No. 1. Similarly, the code signal received by user No. 4 is three times the amplitude of that received by user No. 3, and of the same polarity. A similar table is reproduced in FIG. 6*f*, the only difference between the two tables being that the FIG. 6*e* version represents the condition for the code (*a*) inputs while the FIG. 6*f* version represents that for the code (*b*) inputs.

Just as the table in FIG. 6*a* represents the compression in the match filter of FIG. 3 for the code (*a*), the table in FIG. 6*g* represents the compression in the match filter where the inputs are the linear sums from FIG. 6*e*. In other words, the linear sum shown in the last line of the table of FIG. 6*e* represents the output of the demultiplexer 44 of FIG. 3, whereas the four individual lines of FIG. 6*g* represent the inputs to the linear adder 46. The last line in the table of FIG. 6*g* represents the output of the adder 46 which is applied to the adder 50, for the intial code 1000.

In likewise fashion, the linear sum indicated in the last line of the table of FIG. 6*f* represents the output of the demultiplexer 44 of FIG. 3 for the orthogonally separated code 0100, and applied as such to the lower matched filter of FIG. 3. The four individual lines in the table of FIG. 6*h* represents the inputs to the linear adder 48, with the output therefrom being shown as the last line in this table.

The table of FIG. 6*i* shows the outputs of the linear adders 46 and 48, as well as the linear adder output 50. From this table, it will be seen that no output code is produced during the first or last three intervals of time but that code signals of 8 and 16 units positive polarity are produced, consecutiviely followed by code signals of 8 and 24 units negative polarity. A comparison of the uncoded output attainable from the table of FIG. 6*d* with the output from the table of FIG. 6*i* shows that the compressed information bits available through time multiplexing are totally non-interfering and of a signal voltage 8 times greater. This increase of 8 times in the signal voltage provides the advantageous result of increasing signal-to-noise ratio by that same factor, as well as signal-to-jamming power ratio in a hostile environment.

More importantly, this 8 times improvement is obtainable without any increase in peak power radiated and, consequently, without the need for increasing the size or weight requirements of the radiating equipment. This factor of 8 times also shows the signal voltage being coherently summed in the matched filter so that an input voltage becomes 8 times greater at the output. Because the input noise voltage or jamming voltage interference is uncorrelated at the various input terminals to the linear adders, their increase is not linear, but as a root-mean-square summation. An input voltage V thuse becomes $n$V at the output of the adder 50, where $n$ represents the number of noise code bits contained in each information bit —, in this case, 8 for a 4-bit code of positive and negative polarity. An input interference voltage $\sqrt{N}$ then becomes $\sqrt{nN}$ at the output of the adder 50, and the resultant output signal-to-interference voltage ratio then becomes $\sqrt{n}V/\sqrt{N}$ while the output signal-to-interference power ratio is represented by $nV^2/N$. By increasing the numbers of users accessing the system — and, correspondingly, by increasing the number of code bits — it will be readily apparent that the interference power of a jammer would be significantly reduced whereas the output signal-to-noise power ratio would be substantially enhanced over a multiplexing system utilizing comparable peak power but without the described coding.

The tables of FIG. 7*a*–7*i* are obtained in similar manner to those of FIG. 6, but with the matched filter representations of FIG. 4. With this arrangement, it will be seen that the code mate (*b*) is changed from 0010 (as in FIG. 6) to 0100. Additionally, only three accessing users are employed, each of which receive the coded input of the same polarity and amplitude, but in time intervals 1, 2 and 4. As a comparison of FIGS. 7*d* and 7*i* will show, the signal voltage developed with the multiplexed coding arrangement is again 8 times that obtainable without the described coding, even though the same power is radiated in each case. The change in matched filter to achieve this same 8 times increase is illustrated in FIG. 4 by reversing the positions of the phase control units 82 and 84 as compared to FIG. 3.

As was previously mentioned, the construction of this invention will provide increased detection efficiency for any series of perfect code mates. The construction of FIG. 5, and the tabular results of FIG. 8*a*–8*i*, are those for one of the 8 bit codes shown in FIG. 3 of my Pat. No. 3,461,451. With a more complex code being transmitted, further phase control circuits and time delay circuits are required in the matched filter of the receiver, but similar computations as in FIGS. 6 and 7 will readily show the improved operation which results. Thus, assuming 8 users for the arrangement of FIG. 8, and characterizing them by amplitude and phase characteristics of +1, +2, −1, −3, +1, +2, −1, and −3 (as indicated in FIG. 8*d*), the result shown at the last line in the table of FIG. 8*i* indicates an increase in signal voltage of 16 times over the signal voltage of FIG. 8*d* without perfect coding. Again this follows because of the multiplexed coding in accordance with the invention and, more particularly, through the use of perfect code mate pairs. As long as perfect code mates are employed, signal-to-noise power ratio will increase and interference power will decrease in direct proportion. The result will be readily apparent as being an increase in the detection efficiency of the time division multiple access communications system, without the previous limitations imposed by the physical restraints of the transmitting apparatus or by the limitations in peak radiating power which inherently exist.

While there have been described what are considered to be illustrative embodiments of the present invention, it will be readily apparent to those skilled in the art that modifications may be made by implementation of different perfect code mates and yet still provide the improvements in signalling and power characteristics which result. To carry out the teachings herein, all that would be necessary would be to select the perfect code mate pairs to be used, and to arrange the phase control circuits of FIGS. 3–5 in an inverse, or reverse, relationship with respect to them. Thus, the advantages herein obtained will similarly follow, for example, with the codes 00101000 and 11011000 of my Pat. No. 3,461,451, simply by selecting the phase shift characteristics of the top phase control circuits of FIG. 5 to read 00010100, from left-to-right and the phase shift characteristics of the bottom phase control circuits to read 00011011, also from left-to-right.

I claim:

1. In a multiple access communications system, the combination therewith of:

first means for generating a pair of coded signals;

second means for generating a timing reference signal; and third means for multiplexing said coded signals with said timing reference signal for communication of said coded signals to users accessing said system at predetermined assigned intervals of time;

and wherein said first-mentioned means generates a pair of coded signals which upon receipt and detection by a user accessing the system produces an output signal having an impulse autocorrelation function during his assigned, predetermined interval of time within said timing reference signal.

2. The combination of claim 1 wherein said first-mentioned means generates first and second sequences of coded pulses, the pulses of which have predetermined code patterns, different one from another, but related thereto in that upon receipt and detection, the autocorrelation function of each code will be of substantially equal magnitude and opposite polarity, or zero, for all intervals of time, other than during said assigned, predetermined interval.

3. The combination of claim 1 wherein said first means includes a plurality of code generators, one for each of said pair of coded signals, wherein said second means includes a synchronizing signal generator, and wherein said third means includes a multiplexer coupled to said code and synchronizing signal generators, a transmitter coupled to said multiplexer, a receiver coupled to said transmitter, a demultiplexer coupled to said receiver, and an autocorrelation detector coupled to said demultiplexer to provide said output signal.

4. The combination of claim 3 wherein said autocorrelation detector includes a pair of adder circuits, a plurality of time delay circuits for successively delaying the application of received coded pulses to input terminals of said adders by one interval of time each, and a plurality of phase control circuits for reversing the polarities of selected code pulses applied at said input terminals in accordance with the predetermined code patterns of said coded pulses.

5. The combination of claim 4 wherein sequential ones of said phase control circuits provide a phase reversal of 0° or 180° in inverse relationship to the sequence of coded pulses provided by said first-mentioned means.

* * * * *